G. H. BLETTNER.
METHOD OF MAKING PISTON RINGS AND OF MAKING A TEMPLATE THEREFOR.
APPLICATION FILED MAR. 10, 1919.
1,403,479.
Patented Jan. 17, 1922.
3 SHEETS—SHEET 1.
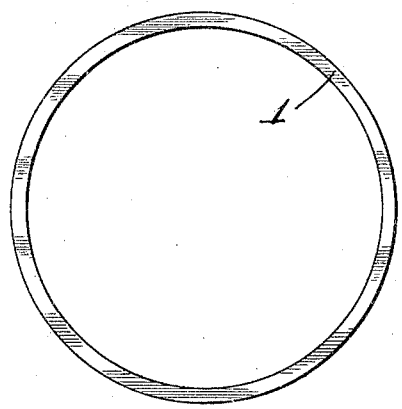
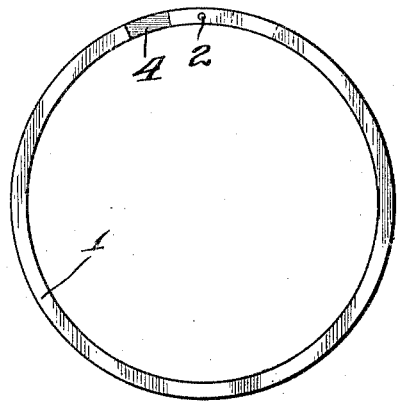
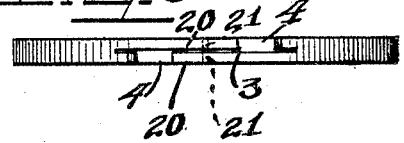
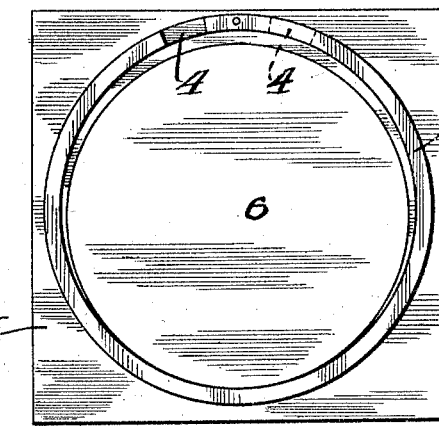
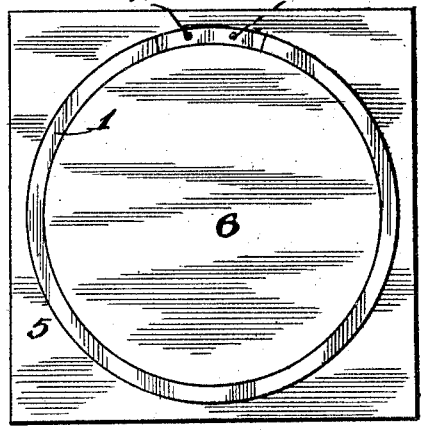
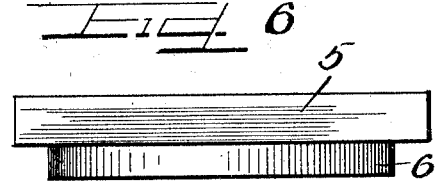

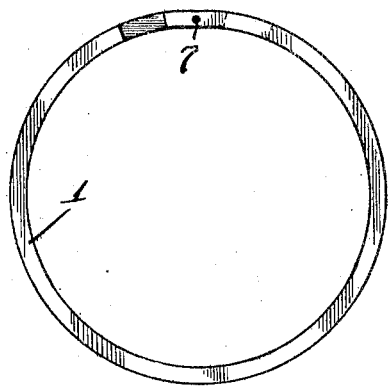
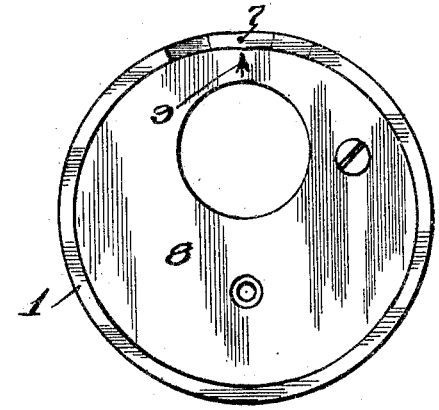
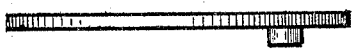
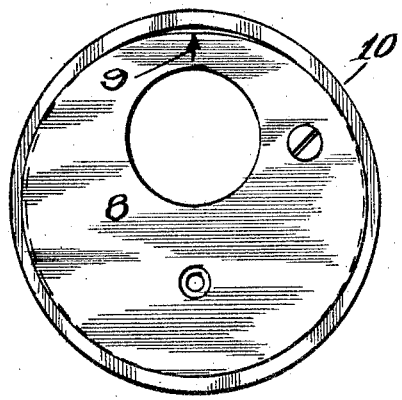
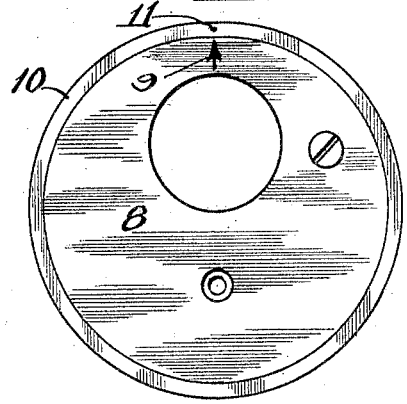

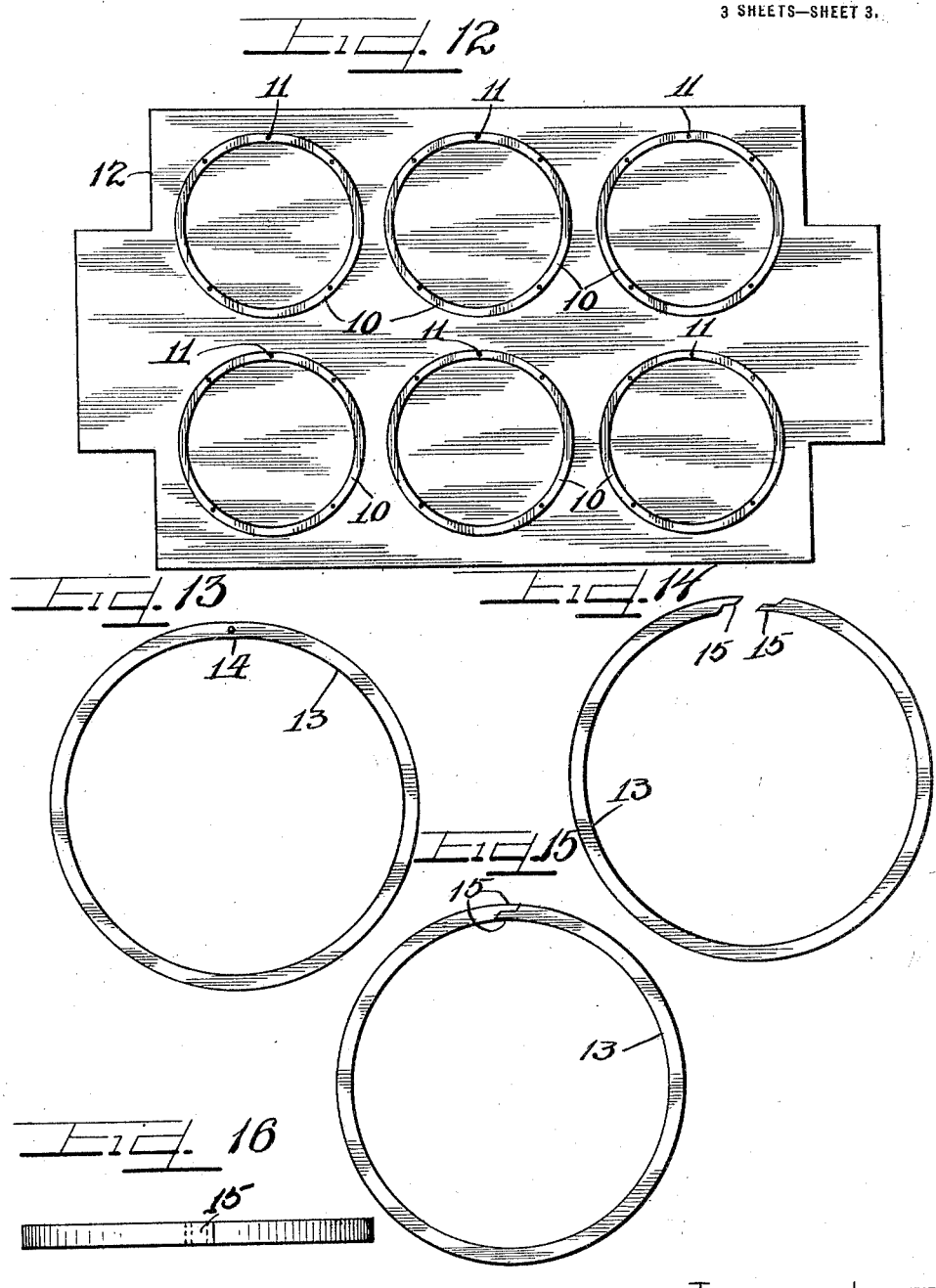

UNITED STATES PATENT OFFICE.

GEORGE H. BLETTNER, OF CHICAGO, ILLINOIS.

METHOD OF MAKING PISTON RINGS AND OF MAKING A TEMPLATE THEREFOR.

1,403,479.  Specification of Letters Patent.  Patented Jan. 17, 1922.

Application filed March 10, 1919. Serial No. 281,655.

*To all whom it may concern:*

Be it known that I, GEORGE H. BLETTNER, a citizen of the United States, and a resident of the city of Chicago, in the county of Cook and State of Illinois, have invented certain new and useful Improvements in Methods of Making Piston Rings and of Making a Template Therefor; and I do hereby declare that the following is a full, clear, and exact description of the same, reference being had to the accompanying drawings, and to the numerals of reference marked thereon, which form a part of this specification.

My invention has reference more particularly to an improved piston ring and concerns a method of making same wherein the ring is reproduced from a form which is compressed and shaped and then expands itself to the form in which the ring is to be made, the present application being in part a continuation of my prior application filed May 5, 1917, Serial No. 166,551.

Another object of my invention is to make a pattern by compressing a resilient split ring and so shaping it that when expanded by its own resiliency it will take the form in which the piston rings are to be made.

My invention contemplates providing a ring of larger diameter than the finished ring when compressed in the cylinder, which said larger ring is split with overlapping parts and shaped around a template or form to the exact size of the finished piston ring when placed in position in a cylinder, after which the said ring is expanded by reason of its own resiliency and without forcible expansion and used as a template or form for making patterns from which piston rings are reproduced.

My invention also has other important objects which will appear from the following specification and accompanying drawings, in which I have described and illustrated my invention in a preferred form.

On the drawings:

Figure 1 is a side view of a ring which is used in the development of the pattern for making the piston rings.

Figure 2 shows the ring split and perforated so as to be compressed.

Figure 3 is an edge view of the ring showing the split joint.

Figure 4 shows the split ring placed on a template or form to be compressed and shaped.

Figure 5 shows the ring compressed and shaped around the template or form.

Figure 6 shows an edge view of the template or form used in shaping the ring.

Figure 7 shows the ring after being shaped around the template in the expanded position which it assumes when released owing to its resiliency.

Figure 8 shows the ring in the expanded position and the template which is made to fit therein.

Figure 9 is an edge view of the template.

Figure 10 is a side view of the template with a solid ring in the process of being shaped to conform to the periphery of the template.

Figure 11 is a side view of the template and ring properly shaped thereon.

Figure 12 is a side view of the pattern for casting the rings.

Figure 13 is a side view of a ring cast from the pattern.

Figure 14 is a side view of the ring with a section cut therefrom which permits contraction of the ring.

Figure 15 is a side view of the ring contracted in true circular form ready for use in the cylinder.

Figure 16 is an edge view of the piston ring of Figure 15, showing the joint thereof.

As shown on the drawings:

The reference numeral 1, indicates a ring of somewhat resilient material which may be turned out in a lathe or otherwise made. This ring is then drilled at 2, after which it is cut circumferentially as at 3, and has a section cut out at each side thereof as at 4, so as to permit contraction of the ring from the original size and provide overlapping parts 20, having corresponding perforations 21, made by drilling the hole 2. A form or template 5, having a circular portion 6, of the exact size of the interior of the finished ring in the contracted condition is provided, and the split ring 1, is placed upon the circular portion 6, and shaped therearound so that when held in the contracted form it fits perfectly the circular form 6. In shaping the ring around the form 6, it is held against its natural tendency to expand, and practically the only shaping of the ring required on the form 6, is the fitting of the overlapped ends 20, of the ring by hammering or otherwise so as to conform to the curvature of the form 6.

As soon as the ring is released and removed from the form 6, it expands by reason of its own resiliency to the original size as shown in Figure 7, so that the perforations 21, return in alignment and a pin 7, may be readily passed through these perforations of the overlapped portions of the ring, to hold the ring securely in position and prevent displacement of the ends during the further use of the ring.

Owing to the shaping of the ring about the form 6, when the ring expands, the overlapped ends retain the curvature of the form and when expanded result in an irregularity in the curvature at the intersection of the overlapped ends, affording a dip or flattened place substantially at the center of the intersecting portions 20, where the pin 7, is located.

A template 8, is then carefully formed so as to accurately fit the inner periphery of the expanded split ring shown in Figure 7, as indicated in Figure 8, which said template will have a corresponding flattened place at the intersection of the overlapped ends of the ring and which is indicated by the arrow at 9.

The template 8, is then used in the making of imperfect rings to be used as patterns, preferably by providing solid rings 10, which may be cut from a tube or pipe of the proper diameter, and these rings are then forced and shaped upon the template 8, as shown in Figures 10 and 11, so that when removed therefrom, they will retain the shape which they have when on the template and a mark 11, is placed on the ring 10, opposite the arrow 9, on the template to indicate the center point of the joint in the original ring.

A number of these rings 10, are then mounted upon the follower board 12, in the usual manner, so as to have castings made therefrom, the mark 11, being impressed or otherwise provided therein so that a corresponding mark will be made in the casting. Solid rings 13, are then cast from the pattern having the mark 14, corresponding to the mark 11, of the pattern, which mark indicates where the joint in the ring is to be made, and the ring is then cut at this point and provided with overlapping portions 15, as shown in Figure 14, or otherwise constructed so that the ring may be compressed as shown in Figures 15 and 16 in a true circular form.

The portion cut from the ring is sufficient to permit the ring to be compressed to a true circular form and the ring is then compressed and held in the true circular form and milled on the outside so as to fit snugly in the cylinder, and owing to the manner in which the ring is constructed, the inner periphery of the ring will fit properly in the groove of the piston without machining, and it is only necessary to smooth up the inner periphery leaving the skin resulting from the casting of the ring, and this results not only in economy of manufacture, but also in a tougher piston ring.

In the making of piston rings heretofore, it has been customary to form a solid ring of the size of the finished piston ring, when compressed, and then split the ring and wedge the ends thereof apart to provide a pattern or form to be used in making piston rings. The rings thus made have a section cut out corresponding to the section inserted in the form so that the new ring may be compressed to the size of the original ring. However, in making a piston ring in this manner, the form or pattern is distorted, owing to the forcible separation of the ends thereof by the placing of the section therebetween, which this distortion is accordingly reproduced in the blank from which the finished piston rings are to be made, with the result that when the blanks have the section cut out therefrom, and are compressed, a uniform circular form is not obtained, and the piston ring does not fit accurately in the cylinder and with a uniform pressure against the walls thereof.

With my method of constructing, however, the piston ring form or pattern after being shaped properly, expands owing to its own resiliency and assumes a natural position without any distorting effect thereon, and the resulting ring blank made from this form, when the section is cut out thereof, may be compressed into a circular form and provides a ring which fits accurately in the cylinder with a uniform pressure on the walls thereof and uniformly fills the groove of the piston.

While I have shown and described my invention in a preferred form, I am aware that various changes and modifications may be made therein without departing from the principles of my invention, and I therefore do not purpose limiting the patent granted hereon otherwise than necessitated by the scope of the appended claims.

I claim as my invention:

1. The method of making a template for piston rings which consists in drilling a hole through a circular ring, splitting said ring so as to provide overlapping parts pierced by said hole, compressing the ring to the size of the desired piston rings, altering while under said compression the unstrained form of said ring, releasing the ring, passing a fastening means through said hole to keep the ring in its unstrained form, and fitting a template to the unstrained ring.

2. The process of forming a template for patterns for piston rings which consists in constraining a split ring to a circular form of the desired size, giving the end portion of the constrained ring a permanent set to the radius they have in the constrained position, allowing the ring to expand and fitting a template to the expanded ring.

3. The process of forming a template for patterns for piston rings which consists in constraining a split ring to a circular form of the desired size, hammering the ring to give its ends a permanent set to the radius of said size, permitting the ring to expand and fitting a template to the expanded ring.

4. The process of making piston rings which consists in producing an unstrained ring of non-circular curvature, fitting a template thereto, marking the template at point of smallest radius, making from said template a ring pattern and from said pattern a mold, making in said mold a mark corresponding to the mark on said template, casting rings in said mold and splitting said rings at the marks thereon.

In testimony whereof I have hereunto subscribed my name in the presence of two subscribing witnesses.

GEORGE H. BLETTNER.

Witnesses:
 EARL M. HARDINE,
 CHARLES W. HILLS, Jr.